(12) United States Patent
Han et al.

(10) Patent No.: US 7,998,450 B2
(45) Date of Patent: Aug. 16, 2011

(54) CONTINUOUS METHODS AND APPARATUS OF FUNCTIONALIZING CARBON NANOTUBE

(75) Inventors: Joo Hee Han, Daejeon (KR); Jin Seo Lee, Daejeon (KR); Seung-Hoe Do, Daejeon (KR); Seong Cheol Hong, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 65 days.

(21) Appl. No.: 12/382,949

(22) Filed: Mar. 27, 2009

(65) Prior Publication Data

US 2010/0065776 A1 Mar. 18, 2010

(30) Foreign Application Priority Data

Mar. 28, 2008 (KR) .................. 10-2008-0029333

(51) Int. Cl.
*D01F 9/12* (2006.01)
(52) U.S. Cl. ............... 423/447.8; 423/447.1; 423/447.3; 423/445 B; 977/742
(58) Field of Classification Search ........... 423/447.1, 423/447.3, 445 B, 447.8; 977/742, 842, 977/843
See application file for complete search history.

(56) References Cited

U.S. PATENT DOCUMENTS

| 7,419,601 | B2* | 9/2008 | Cooper et al. | 210/679 |
| 2006/0239891 | A1* | 10/2006 | Niu et al. | 423/445 R |
| 2007/0009426 | A1* | 1/2007 | Leveson | 423/659 |

FOREIGN PATENT DOCUMENTS

| JP | 103 00 599 | 7/2004 |
| JP | 2005-263607 | 9/2005 |
| KR | 2001-0102598 | 11/2001 |
| KR | 10-0450029 | 9/2004 |
| KR | 10-2005-0009711 | 1/2005 |
| KR | 2006-44194 | 5/2006 |
| KR | 10-2007-0114553 | 12/2007 |

OTHER PUBLICATIONS

Park, K.; Hayashi, T.; "Progressive and Invasie Functionalization of Carbon Nanotube Sidewalls by Diluted Nitric Acid Udner Supercritical Conditions". J. Mater. Chem. 2005, 15, 407-411.*
K. Park et al., "Progressive and invasive functIonalization of carbon nanotube sidewalls by diluted nitric acid under supercritical conditions", J. Mater. Chem., 2005, 15, 407-411.

* cited by examiner

*Primary Examiner* — Stuart Hendrickson
*Assistant Examiner* — Richard M Rump
(74) *Attorney, Agent, or Firm* — Clark & Brody

(57) ABSTRACT

The present invention relates to a continuous method and apparatus of functionalizing a carbon nanotube, and more specifically, to a continuous method of functionalizing a carbon nanotube under subcritical water or supercritical water conditions without additional functionalizing processes, comprising: a) continuously feeding the carbon nanotube solution and an oxidizer under a pressure of 50 to 400 atm, respectively or together, and then preheating the mixture of said carbon nanotube solution and said oxidizer; b) functionalizing the carbon nanotube in the preheated said mixture under the subcritical water or the supercritical water condition of 50 to 400 atm; c) cooling down the functionalized product into 0 to 100° C. and depressurizing the functionalized product into 1 to 10 atm; and d) recovering the cooled down and depressurized product.

11 Claims, 6 Drawing Sheets

CONTINUOUS METHODS AND APPARATUS OF FUNCTIONALIZING CARBON NANOTUBE

TECHNICAL FIELD

The present invention relates to a continuous method and apparatus of functionalizing a carbon nanotube, and more specifically, to continuous method of functionalizing a carbon nanotube under subcritical water or supercritical water condition.

BACKGROUND ART

A structure of a carbon nanotube (hereinafter, referred to as CNT) was first found in 1991. Synthesis, physical property, and application of the carbon nanotube have been actively studied. Also, it has been confirmed that the CNT is produced by adding transition metals such as ferrum (Fe), nickel (Ni) and cobalt (Co), at the time of discharging electricity. A full study started from a preparation of a significant amount of samples by a laser evaporation method in 1996. The CNT takes a form of a round wound hollow tube whose graphite surface is a diameter of a nano size. At this time, the CNT has electrical characteristics such as conductor property, semi-conductor property, etc., according to the wound angle or structure of the graphite surface. Also, the CNT is divided into a single-walled carbon nanotube (SWCNT), a double-walled carbon nantube (DWCNT), a thin multi-walled carbon nanotube, a multi-walled carbon nanotube (MWCNT), and a roped carbon nanotube according to the number of the graphite walls.

In particular, the CNT has excellent mechanical strength or elastic strength, chemical stability, eco-friendliness, and electrical conductor and semiconductor property as well as has an aspect ratio larger than the existing any materials, wherein the aspect ratio reaches about 1,000 as a diameter of 1 mm to several tens nm and a length of several μm to several tens μm. Also, the CNT has a very large specific-surface area. As a result, the CNT is being interested as advanced new materials, which will lead the twenty-first century, in the field of next-generation information electronic materials, high-efficiency energy materials, high-functional complex materials, eco-friendly materials, and the like.

However, in spite of various advantages owned by the CNT, since the CNT has very large agglomeration phenomenon and very large hydrophobic property, the CNT is very poor in terms of the mixed property with other media as well as does not have solubility to organic solvents in addition to water. Therefore, in order to expand the applications of the CNT while having the advantages of the CNT, a method capable of increasing compatibility with various media and making dispersion efficiency good is needed. As a technology of increasing the compatibility with CNT, there is a functional group substituting technology capable of providing separate characteristics on a surface, for example, there are a method of increasing the specific-surface area of CNT using strong bases such as potassium hydroxide, sodium hydroxide, etc., under vacuum and inert gas atmosphere as described in KR Patent No. 450,029 and a method of treating a surface of CNT using strong acids or strong bases as described in KR Patent Publication Nos. 2001-102598, 2005-9711, and 2007-114553.

However, since the above technologies use strong acids, such as nitric acid, sulfuric acid, etc., or strong bases, such as potassium hydroxide, sodium hydroxide, etc., they are harmful to environment, are not easy to handle, and can cause the corrosion of a reactor. Further, they need further processes, such as a process of washing used acids and bases, or cause a large amount of harmful wastes. In addition, since they have long reaction time and limited throughput, the efficiency is low and in order to provide the functional group in addition to oxygen on the surface, since they need separate processes, much cost and time are consumed.

DISCLOSURE OF THE INVENTION

In order to solve the above problems, it is an object of the present invention to provide a continuous method and apparatus of functionalizing a carbon nanotube under subcritical water or supercritical water condition by using a continuous apparatus without separate functionalizing processes.

In order to achieve the above object, there is provided a continuous method of functionalizing a carbon nanotube, comprising: a) continuously feeding the carbon nanotube solution and an oxidizer under a pressure of 50 to 400 atm, respectively or together, and then preheating the mixture of said carbon nanotube solution and said oxidizer; b) functionalizing the carbon nanotube in the preheated said mixture under the subcritical water or the supercritical water condition of 50 to 400 atm; c) cooling down the functionalized product into 0 to 100° C. and depressurizing the functionalized product into 1 to 10 atm; and d) recovering the cooled down and depressurized product.

Further, there is provided a continuous apparatus of functionalizing a carbon nanotube, comprising: a preheater for preheating the mixture obtained by continuously adding an oxidizer to carbon nanotube solution under a pressure of 50 to 400 atm while carbon nanotube solution is being fed under a pressure of 50 to 400 atm; a reactor for functionalizing the mixture obtained in the preheater, under the subcritical water or the supercritical water conditions of 50 to 400 atm; a cooling down and depressurizing part for cooling down the functionalized product obtained in the reactor into 0 to 100° C. and depressurizing the functionalized product into 1 to 10 atm; and a product storing part for recovering the product obtained in the cooling down and depressurizing part.

Hereinafter, one preferred example of the present invention will be described with reference to the accompanying drawings. First, it is to be noted that like components or parts are denoted by like reference numerals throughout the drawings. In describing the present invention, a detailed description of related known functions or configurations will be omitted so as not to obscure the subject of the present invention.

Terms used in the specification, "about", "substantially", etc., which represents a degree, are used as meanings at numerical values or approaching numerical values when inherent tolerances of preparation and material are presented to the above-mentioned meanings and they are used to prevent unconscientious invaders from unfairly using the contents in which accurate or absolute numerical values are disclosed in order to help the understandings of the present invention, are disclosed.

FIG. 1 is a diagram showing a continuous process of functionalizing a carbon nanotube according to one example of the present invention. Referring to FIG. 1, a continuous method of functionalizing a carbon nanotube of the present invention comprises: a) preheating (S100); b) functionalizing (S200); c) cooling down and depressurizing (S300); and d) product recovering (S400). The continuous method of functionalizing a carbon nanotube may further comprises e) filtering (S310) that filters the product functionalized after the cooling down that is step c) and f) dispersing (S410) that disperses the product of step d).

FIG. 2 is a diagram showing a continuous apparatus process of functionalizing a carbon nanotube according to one example of the present invention. Referring to FIG. 2, the continuous apparatus of functionalizing a carbon nanotube of the present invention may comprise a preheater 110, a functionalizing reactor 130, a cooling down and depressurizing part 150, and a product storing part 170.

First, in the preheating (S100), a) the mixture of the carbon nanotube (CNT) solution and an oxidizer are continuously fed to preheater 110 under a pressure of 50 to 400 atm, respectively or together, and then the mixture of said carbon nanotube solution and said oxizer are preheated in the preheater 110.

The carbon nanotube (CNT) solution can be prepared by mixing CNT and solvent using a circulation pump 10 before the CNT solution is fed under high pressure.

The solvent included in the CNT solution may be selected from a group consisting of water, aliphatic alcohol, carbon dioxide, and mixtures thereof.

Also, the CNT may be prepared to be included as 0.0001 to 10 wt % in the CNT solution, more preferably, 0.001 to 3 wt %. If the CNT is less than 0.0001 wt %, the recovery amount of the CNT is too small and if the CNT exceeds 10 wt %, the viscosity of the CNT solution increases such that it is difficult to feed the CNT solution under high pressure.

In the process of feeding the prepared CNT solution to the preheater 110 under a pressure of 50 to 400 atm using a high-pressure feeding pump 12, the CNT solution contacts oxidizer and the mixture of the CNT solution and the oxidizer is mixed at a front end of a heat exchanger 14 and fed into the preheater 110, which the mixture is preheated to a temperature of 100 to 370° C.

Upon feeding the CNT solution or the oxidizer using the high-pressure feeding pump, if the pressure is less than 50 atm, it is difficult to feed the CNT solution into the preheater 110 or to add the oxidizer into the CNT solution and if the pressure exceeds 400 atm, energy loss occurs due to too high pressure and a functionalized degree is not improved any more in terms of functionalizing the CNT.

The preheater 110 is to previously preheat the mixture before the mixture is processed under subcritical water or supercritical water condition to be described later and constantly maintain a temperature of a reactor 130.

As a result, the front end of the preheater 110 is installed with the heat exchanger 14 to perform a role of preheating the mixture of the CNT solution and the oxidizer, wherein the heat exchanger 14 primarily drops temperature before the functionalized product under the subcritical water or the supercritical water condition to be described later is finally cooled to perform a role of preventing energy loss consumed at the time of the cooling later. If the temperature is less than 100° C., the temperature is further raised at a threshold condition such that there is no effect of preventing the energy loss and if the temperature exceeds 370° C., the energy loss consumed to raise the temperature beyond the temperature achieving the preheating effect increases such that an installation effect of the heat exchanger is lost.

Preferably, the CNT is selected from a group consisting of single-walled, double-walled, thin multi-walled, multi-walled, roped, and mixtures thereof.

Meanwhile, the oxidizer may be selected from oxygen, air, ozone, nitric acid, hydrogen peroxide, and mixtures thereof and may be included as 0.001 to 10 equivalents in proportion to the carbon equivalent of the CNT in the mixture. The CNT is oxidized and functionalized by the oxidizer, such that dispersibility of the CNT increases. As a result, if the CNT exceeds 10 equivalents, the functionalized effect is not big compared to the excessed amount such that raw materials are wasted.

A functionalizing step (S200) is performed using the mixture obtained in the preheater.

b) the mixture preheated in the preheater 110 of step a) is transferred to the continuous functionalizing reactor 130 and the functionalizing step is performed on the carbon nanotube under the subcritical water or the supercritical water condition of the 50 to 400 atm. Also, it is preferable that the temperature of functionalizing is 100 to 600° C. under the subcritical water or the supercritical water condition.

The pressure of the subcritical water condition is preferably 50 to 260 atm, more preferably, 60 atm to 260 atm. Also, the temperature is preferably 100 to 380° C., more preferably, 200 to 350° C. At this time, the process is preferably performed for 1 to 30 minutes, more preferably, 5 to 15 minutes.

Meanwhile, the supercritical water condition is preferably 150 to 400 atm, more preferably, 210 to 300 atm. Further, the temperature is preferably 350 to 600° C., more preferably, 370 to 500° C. At this time, the process is preferably performed for 1 to 30 minutes, more preferably, 5 to 15 minutes.

The oxidizer and the CNT solution are completely mixed due to the subcritical water or the supercritical water condition and the oxidizer is well and rapidly penetrated between the CNT particles agglomerated in the subcritical and supercritical states to uniformly oxidize the surface of the CNT. Therefore, the penetration of the oxidizer is excellent under subcritical water or supercritical water conditions, such that the oxidization reaction is more uniform and performed at a high speed, thereby improving the functionalizing effect.

The subcritical water or supercritical water condition, which is a selective condition for controlling the functionalized level, means that water is in the range of the above-mentioned temperature or pressure conditions.

In particular, if CNT is functionalized under the subcritical water condition, there is higher dispersibility in water or organic solvent.

Also, if CNT is functionalized under the supercritical water condition, there is the effect of functionalization similar to the effect of the functionalization under the subcritical water though the CNT is functionalized using a smaller amount of oxidizer than the amount of oxidizer used under the subcritical water.

A heat source of the heat exchanger 14 which is installed at the front end of the preheater 110, is obtained the high temperature of the product transferred from the functionalizing reactor.

So the heat source of the heat exchanger can be used to preheat the mixture and be also used to primarily cool down the high temperature of the into 100 to 370° C., thereby making it possible to prevent energy loss.

The functionalized product obtained in the functionalizing step is cooled down and depressurized.

c) cooling down the functionalized product into 0 to 100° C. and depressurizing it into 1 to 10 atm can be performed.

After the functionalized product is primarily cooled down by the heat exchanger 14, the step of cooling down it into 0 to 100° C. by a cooling down part 15 is performed. It is preferable that the cooling down temperature is 20 to 50° C.

The cooled down product is transferred to the cooling down and depressurizing part 150, which can perform the cooling and depressurizing step into 1 to 10 atm. In the cooling down and depressurizing step, the cooling down and depressurizing part is first reduced into 10 to 100 atm in pressure by a capillary system and finally depressurized into 1 to 10 atm by a pressure controlling system 16 while first maintaining the cooled down state as it is.

d) The step of recovering the final product obtained in the cooling down and depressurizing step to the product storing part 170 can be performed. Therefore, as the functionalized product, that is the functionalized carbon nanotube solution, of the present invention is completed, and then the product recovering step (S400) can be performed.

The product can be used in a solution state as it is but can be recovered to be used as powders. In order to obtain the functionalized CNT product of the powder form, after the functionalized product is cooled down in step c), e) the high-pressure filtering step can be further included.

Therefore, the cooling down and depressurizing step further may include the filtering step (S310).

FIG. 3 is a diagram showing a continuous apparatus process of functionalizing a carbon nanotube including a filtering system according to one preferred example of the present invention. Referring to FIG. 3, in order to filter the product functionalized and cooled in the apparatus of FIG. 1, it can further include filtering systems 210 and 230 that include high-pressure filters having pore sizes of 0.001 to 10 μm and connected in parallel and is operated in a switching manner. The product is separated into filtrates 211 and 231 and the functionalized CNT filtering product 213 and 233 through the filtering systems 210 and 230. The filtrates 211 and 231 are depressurized into a normal pressure by a filtering pressure controlling system 21 and transferred to a filtrate storing part 300 The filtering systems 210 and 230 of more than one can be installed in parallel according to necessary capacity.

In detail, when the product is separated into the functionalized CNT filtering product and the filtrate in the filtering systems 210 and 230 connected in parallel, if pressure is applied to the filtering system 210, a valve is closed and the filtering system 230 is opened such that the functionalized and cooled product is filtered and at the same time, the functionalized CNT filtering product 213 is recovered into the filtering system 210 and the filtrate 211 is transferred to the filtrate storing part 300 for treatment.

If pressure is applied to the filtering part 230 in the same method, the valve is closed and the filtering part 210 is opened such that the processes of filtering the continuously functionalized and cooled product, recovering the functionalized CNT filtering product 233 into the filtering system 230, and transferring the filtrates 231 to the filtrate storing part 300 for treatment are alternately performed repetitively, thereby performing the filtration in the switching manner and continuously performing the functionalization.

Further, after the functionalizing, cooling down and depressurizing or filtering, the dispersing step (S410) may be further included.

In detail, using the functionalized, cooled down and depressurized product of solution state or the filtered product obtained in step e), that is, the functionalized CNT product of step d), dispersing the product of step f) can be further included after step d) or e).

The dispersion may be selected from a group consisting of ultrasonic wave, fluidizer, pulverizer, bead mill, and paint shaker.

Herein, the product obtained in the step d) or e) can be dispersed in water or organic solvent and the product can be included as 0.00001 to 10 wt % in the product and solvent. The organic solvent can be selected from a group consisting of hydro carbon, alcohol, ketone, amine, alkyl halogen, ether, furan, sulfur containing solvent, and mixtures thereof. When the content of the product dispersed in the solvent is less than 0.00001 wt %, it is difficult to estimate the dispersibility improvement effect and when the content of the product dispersed in the solvent exceeds 10 wt %, it is difficult to effectively disperse the product due to the increase of viscosity in the dispersion process.

As described above, the continuous method of functionalizing a carbon nanotube of the present invention is not harmful under the subcritical water or the supercritical water condition, uses the oxidizer that is easy to handle and to treat waste water, and reduces the preparing process by functionalizing the carbon nanotube through the continuous apparatus.

Further, the carbon nanotube of the present invention is obtained through the continuous apparatus in the solution form or the powder form according to applications.

DETAILED DESCRIPTION OF MAIN ELEMENTS

Figure 1:
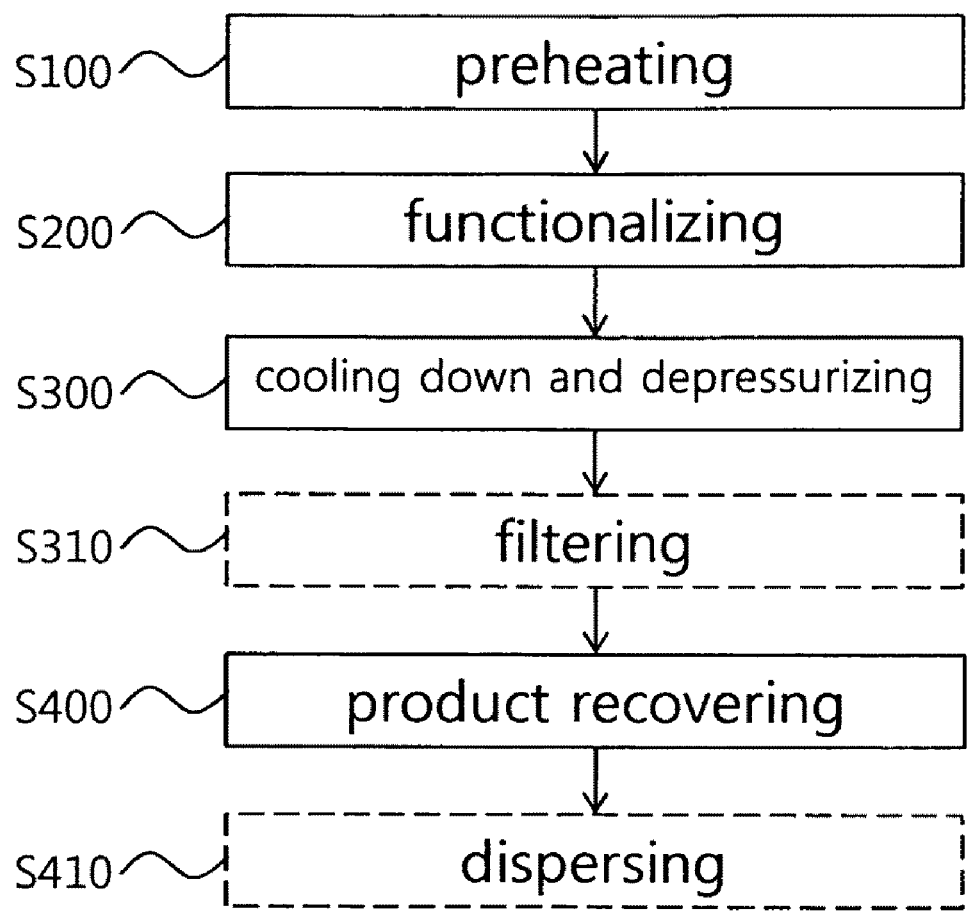
FIG. 1 is a diagram showing a continuous process of functionalizing a carbon nanotube according to one example of the present invention.
Figure 2:
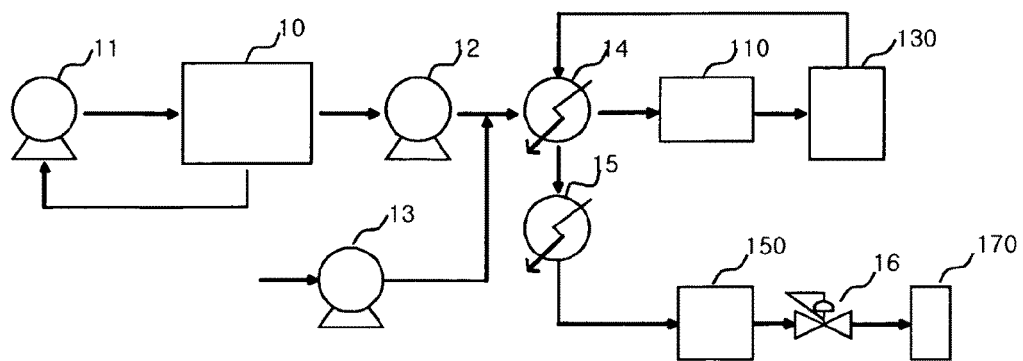
FIG. 2 is a diagram showing a continuous apparatus process of functionalizing a carbon nanotube according to one example of the present invention.
Figure 3:
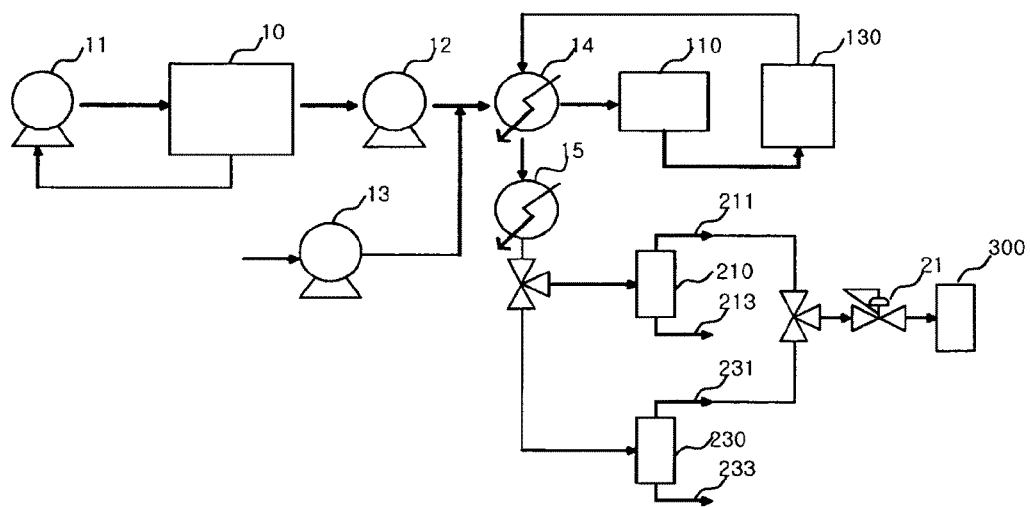
FIG. 3 is a diagram showing a continuous apparatus process of functionalizing a carbon nanotube including a filtering system according to one preferred example of the present invention.

10: pre-treating part
11: circulation pump
12: high-pressure feeding pump for CNT solution
13: high-pressure feeding pump for oxidizer
14: heat exchanger
15: cooling down part
16: pressure controlling system
21: filtering pressure controlling system
110: preheater
130: functionalizing reactor
150: cooling down and depressurizing part
170: product storing part
210, 230: filtering system
211, 231: filtrate
213, 233: functionalized CNT filtering product
300: filtrate storing part

BEST MODE FOR CARRYING OUT THE INVENTION

The present invention will be described in detail with reference to the following examples.

Example 1

CNT solution is prepared in a pre-treating part 10 by mixing multi-walled CNT of 10 g and distilled water of 990 g by a circulation pump 11. Before the CNT solution is fed into the preheater 110 at a flow rate of 30 g/min through a high-pressure feeding pump 12, oxygen in gaseous form compressed at 245 atm to 252 atm is mixed with the CNT solution at flow rate of 0.8 g/min at a front end of a heat exchanger 14 and then, the mixture is fed into the preheater 110 preheated into 200 to 260° C. through the heat exchanger 14.

The preheated mixture is fed into a functionalizing reactor 130 into 350° C. and 230 atm to 250 atm in a state of subcritical water and is functionalized and the functionalized product is back transferred to the heat exchanger 14, primarily cooled down into 200° C., and then back cooled down into about 25° C. through the cooling down part 15, thereby obtaining the continuously functionalized product of 9.8 g.

Example 2

The product of 9.2 g is obtained by performing the same functionalization as Example 1 except that oxygen, which is oxidizer, is mixed with the CNT solution at flow rate of 0.4 g/min, the temperature of the heat exchanger 14 is 350 to 370° C. at the time of preheating the mixture, and the functionalization is performed by performing the reaction in the supercritical water state and the reaction into a temperature of 400° C.

Example 3

The product of 18.6 g is obtained by performing the same functionalization as Example 1 except that CNT solution is prepared in a pre-treating part 10 by mixing multi-walled CNT of 20 g and distilled water of 980 g by a circulation pump 11.

Example 4

The product of 9.6 g is obtained by performing the same functionalization as Example 1 except that air instead of oxygen as oxidizer is used.

Example 5

The product of 9.7 g is obtained by performing the same functionalization as Example 2 except that air instead of oxygen as oxidizer is used.

Example 6

The product of 9.1 g is obtained by performing the same functionalization as Example 1 except that ozone instead of oxygen as oxidizer is used.

Example 7

The product of 9.2 g is obtained by performing the same functionalization as Example 2 except that ozone instead of oxygen as oxidizer is used.

Example 8

The product of 8.7 g is obtained by performing the same functionalization as Example 1 except that 50% hydrogen peroxide aqueous liquid of 108.8 g (1.6M) instead of oxygen as oxidizer is used.

Example 9

The product of 9.0 g is obtained by performing the same functionalization as Example 2 except that 50% hydrogen peroxide aqueous liquid of 108.8 g (1.6M) instead of oxygen as oxidizer is used.

Example 10

The product of 8.3 g is obtained by performing the same functionalization as Example 1 except that nitric acid instead of oxygen as oxidizer is used, multi-walled CNT of 10 g and distilled water of 964.8 g are put and then agitated in the pre-treating part 10 and the nitric acid of 25.2 g (0.4M) is added thereto to prepare a mixture of the CNT and nitric acid solution.

Example 11

The product of 8.1 g is obtained by performing the same functionalization as Example 2 except that nitric acid instead of oxygen as oxidizer is used, multi-walled CNT of 10 g and distilled water of 964.8 g are put and then agitated in the pre-treating part 10 and nitric acid of 25.2 g (0.4M) is added thereto to prepare a mixture of the CNT and nitric acid solution.

Example 12

The continuously functionalized product of 9.5 g is obtained by cooling the product functionalized in the same manner as Example 1, separating it into CNT filtering product and filtrate that are functionalized in filtering systems 210 and 230 having a pore size of 0.001 to 10 μm and high-pressure filters connected in parallel, and recovering the functionalized CNT filtering product.

Example 13

The continuously functionalized product of 8.8 g is obtained by cooling the product functionalized in the same manner as Example 2, separating it into CNT filtering product and filtrate that are functionalized in the filtering baths 210 and 230 having a pore size of 0.001 to 10 μm and high-pressure filters connected in parallel, and recovering the functionalized CNT filtering product.

Comparative Example 1

The same reaction as Example 1 is performed without adding oxidizer.

Comparative Example 2

The same reaction as Example 2 is performed without adding oxidizer.

\* Test Method

1. Infrared Spectroscopy (FT-IR Spectroscopy)

It used Model No. 4100 by Varian Co., and performed the measurement by mixing a sample for analysis with potassium bromide (KBr) powder, uniformly agitating in pestle porcelain, and then, preparing pellet.

Figure 4:
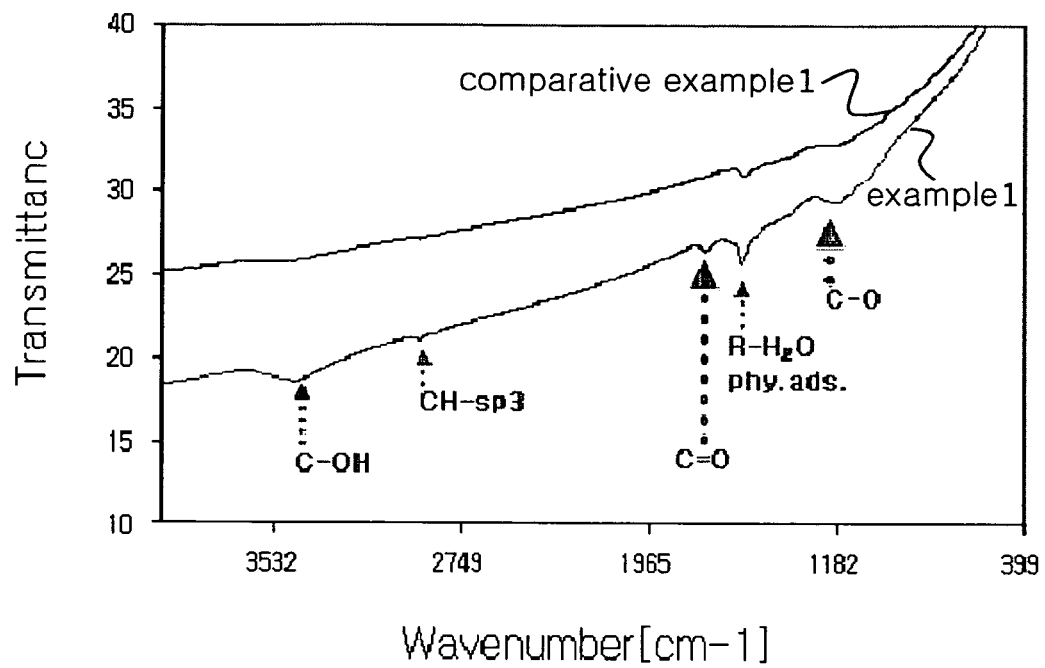
FIG. 4 is a diagram showing an infrared spectroscopy result of a functionalized carbon nanotube according to an example 1 and a comparative example 1 of the present invention.

FIG. 4 is a diagram showing an infrared spectroscopy result of a functionalized carbon nanotube according to an example 1 and a comparative example 1 of the present invention. Referring to FIG. 4, it can be confirmed that the peak of the functionalized group exhibits compared to Comparative Example 1 and the functionalization is done. The functionalized structure obtained from the measurement result is a hydroxy group, an alcohol group, a carboxylic acid group, a ketone group, an ether group, and a CH-sp3 group.

2. Raman Spectroscopy

As LabRam HR model by Jobin-Yvon Co., an apparatus using a 800 nm focal length monochromator and a light source having argon ion laser 514.532 nm wavelength was used. As the sample, powders obtained by drying moisture in a vacuum drying oven, were used.

Figure 5:
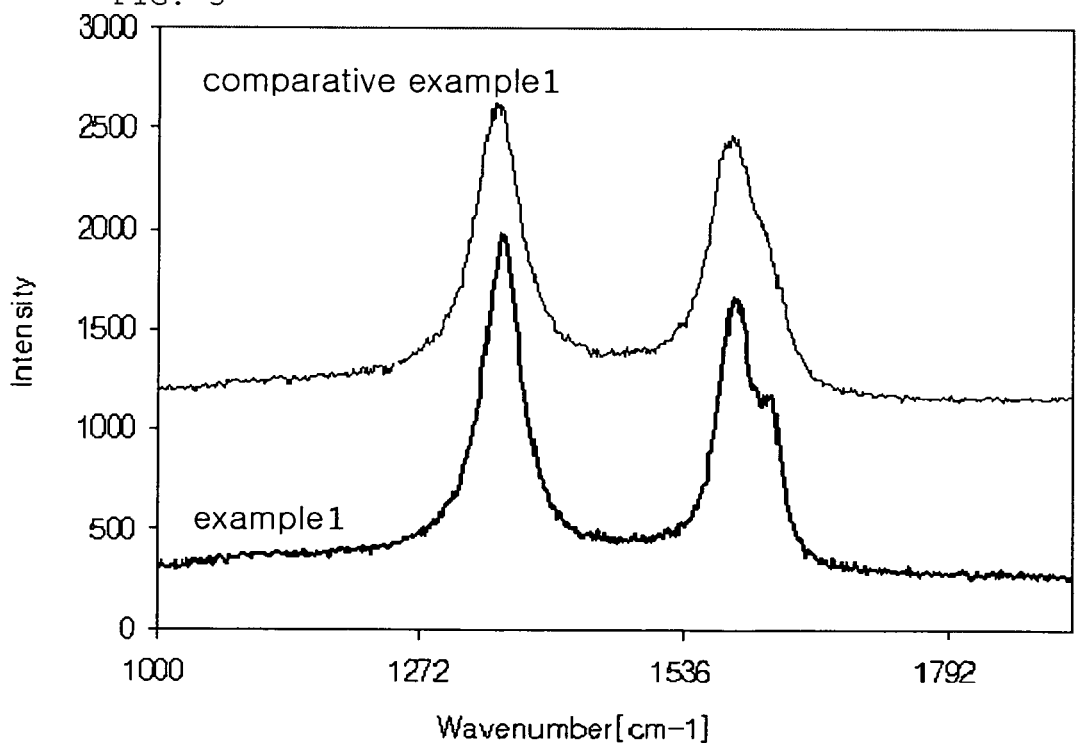
FIG. 5 is a diagram showing a Raman spectrum result of a functionalized carbon nanotube according to an example 1 and a comparative example 1 of the present invention.

FIG. 5 is a diagram showing a Raman spectrum result of a functionalized carbon nanotube according to an example 1 and a comparative example 1 of the present invention. Referring to FIG. 5, it can be confirmed that a peak change of Example 1 exhibits near (G peak) 1580 $cm^{-1}$ compared to Comparative Example 1 and a surface is oxidized. The changed peak exhibits at 1620 $cm^{-1}$ peak (D' peak). The ratio of the 1580 $cm^{-1}$ peak to the changed 1620 $cm^{-1}$ peak [R=D' peak area ($A_D$)/G peak area ($A_G$)] was calculated through Raman spectrum to estimate the degree of the CNT functionalization.

3. Transmission Electron Microscope (TEM)

It used JEM-2100F (HR) model by JEOL Co. and performed the measurement on the halic type of grid.

Figure 6A:
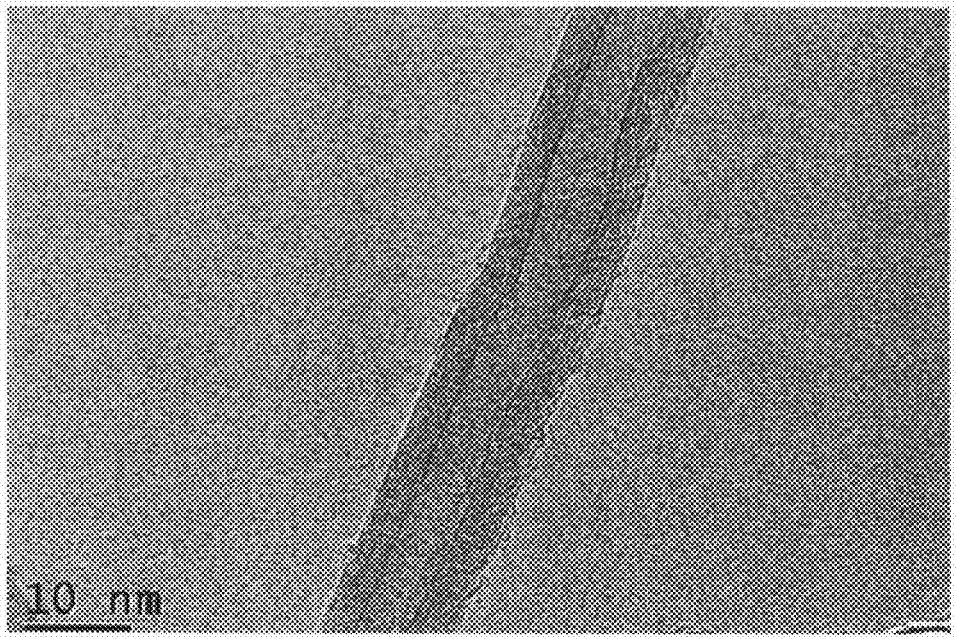
FIGS. 6A and 6B are photographs of a transmission electron microscope (TEM) of a functionalized carbon nanotube according to an example 1 and a comparative example 1 of the present invention.
Figure 6B:
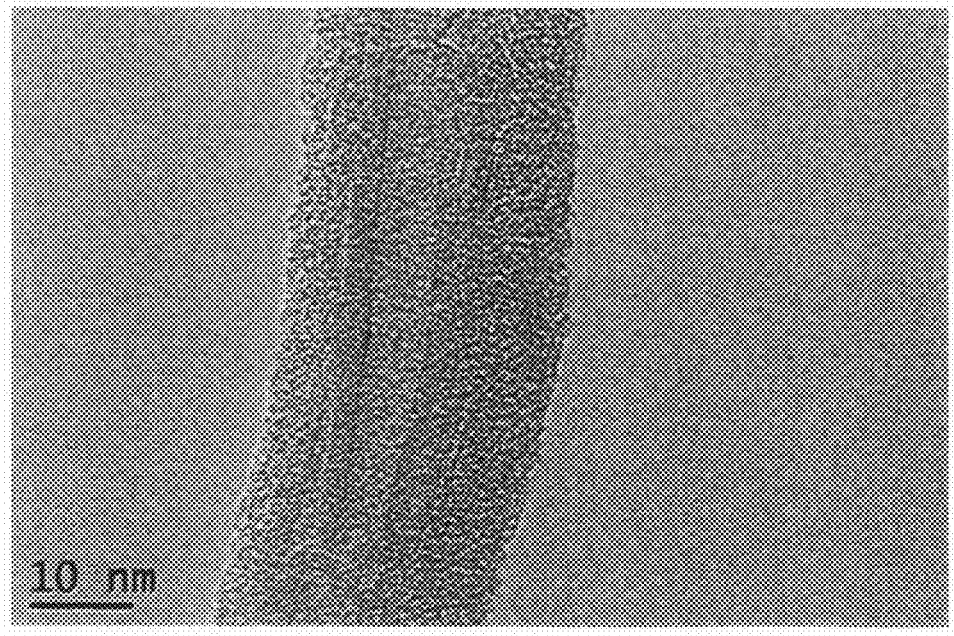

FIG. 6A is a photograph of a transmission electron microscope (TEM) of a functionalized carbon nanotube according to an example 1 of the present invention and FIG. 6B is a photograph of a transmission electron microscope (TEM) of a functionalized carbon nanotube according to a comparative example 1 of the present invention. It can be appreciated that a border line of the functionalized carbon nanotube wall according to FIG. 6B is obscure and thus, the functionalization was done.

4. Dispersion State

It is a state where the carbon nanotube of 0.2 g, which is functionalized according to Example 1 of the present invention, is dispersed in water of 99.8 g.

Figure 7:
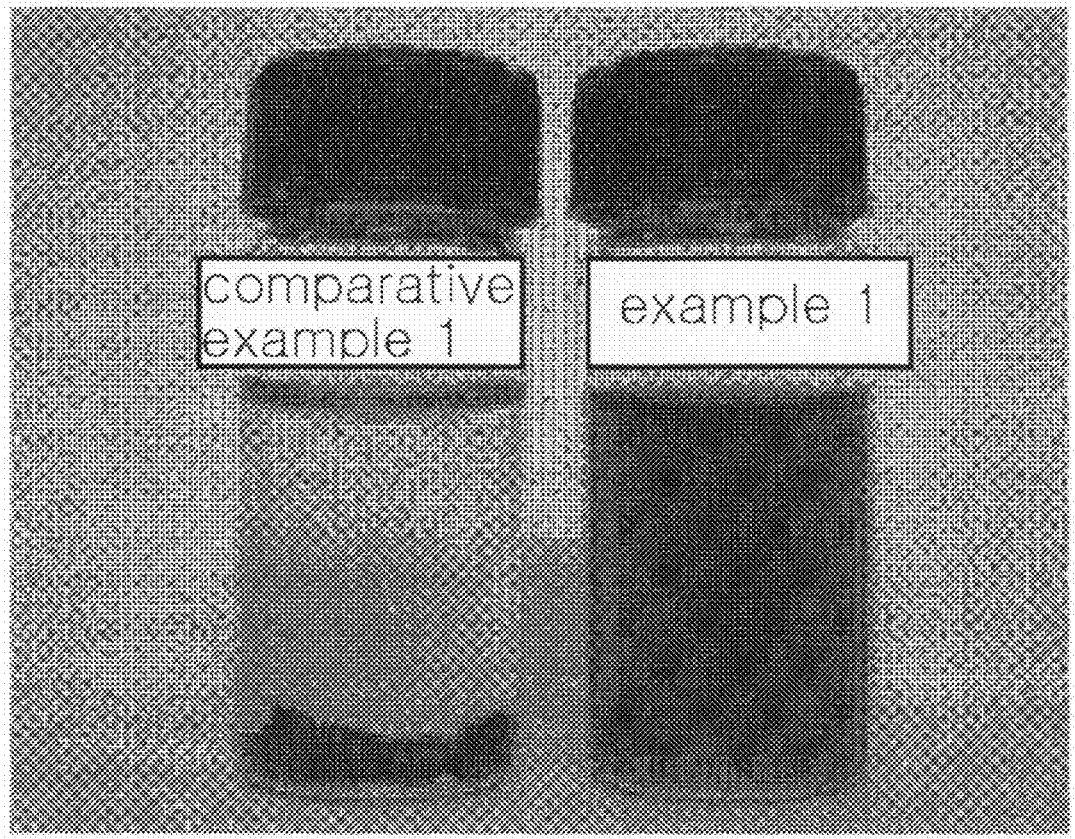
FIG. 7 is a diagram showing a water-based or organic solvent-based dispersion state of a functionalized carbon nanotube according to an example 1 and a comparative example 1 of the present invention.

FIG. 7 is a diagram showing a water-based state of a functionalized carbon nanotube according to an example 1 and a comparative example 1 of the present invention. Referring to FIG. 7, the dispersion effect does not exhibit in Comparative Example 1 to sink the CNT, which is not separated from water. It can be confirmed from the case of Example 1 that the CNT is not sunk and is uniformly dispersed, thereby making it possible to improve the dispersion state by the functionalization.

5. X-Ray Photoelectron Spectroscopy (XPS)

It measured using ESCALAB 250 model by VG Scientifics Co. The sample used powders obtained by drying moisture in a vacuum drying oven.

Figure 8:
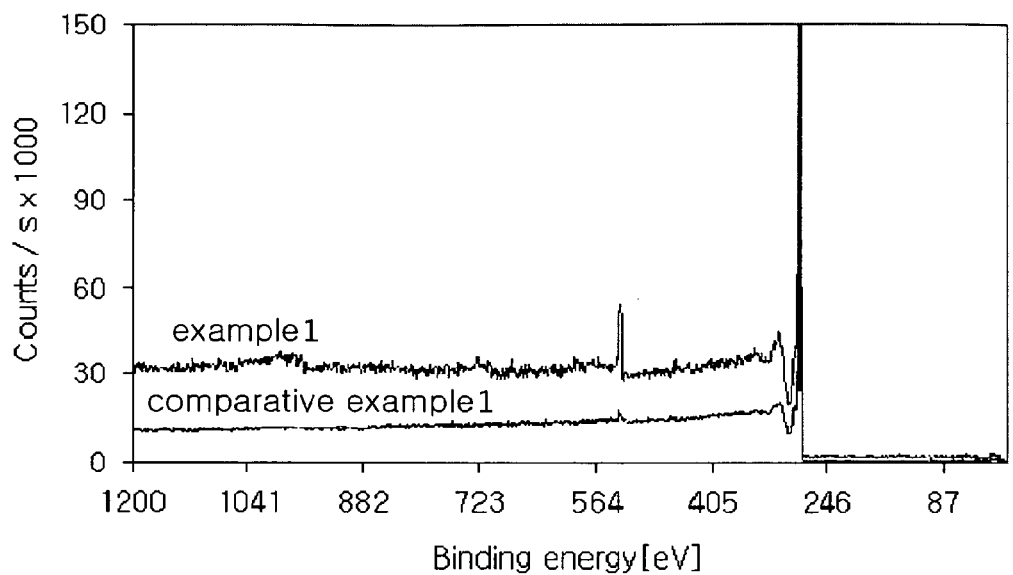
FIG. 8 is a diagram showing an X-ray photoelectron spectroscopy spectrum (XPS) result of a functionalized carbon nanotube according to an example 1 and a comparative example 1 of the present invention.

FIG. 8 is a diagram showing an X-ray photoelectron spectroscopy spectrum (XPS) result of a functionalized carbon nanotube according to an example 1 and a comparative example 1 of the present invention. Referring to FIG. 8, it can confirm the functionalized oxidation effect of the CNT from the peak that remarkably exhibits frequency near binding energy of 564 eV compared to Comparative Example 1. It is possible to estimate the functionalized degree of the CNT using relative content of carbon and oxygen peak observed from XPS.

6. UV/vis Spectroscopy

It used DU650 model by Beckman Co. The sample was results measured by diluting dispersion of FIG. 6 dispersed by using water or organic solvent.

Figure 9:
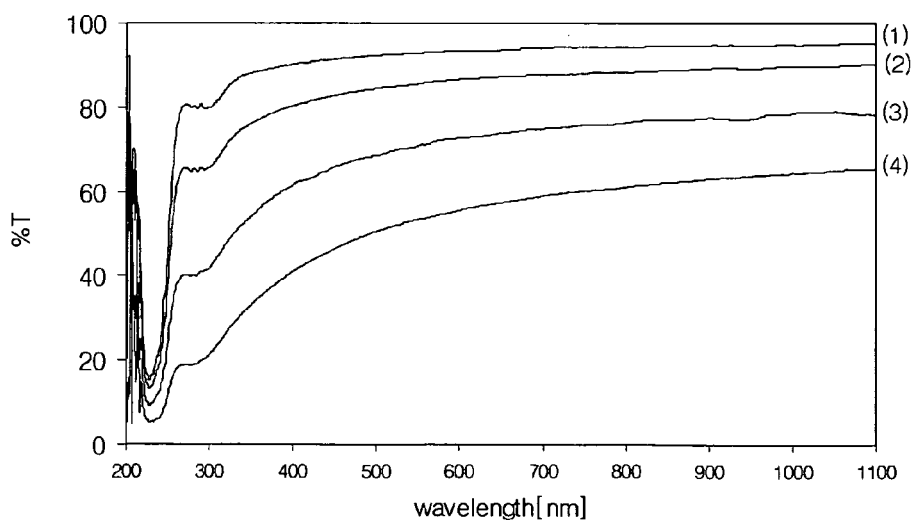
FIG. 9 is a diagram showing a UV/Vis spectroscopy spectrum result according to a concentration of a functionalized carbon nanotube according to an example 1 of the present invention.

FIG. 9 is a diagram showing a UV/Vis spectroscopy spectrum result according to a concentration of a functionalized carbon nanotube according to an example 1 of the present invention. Referring to FIG. 9, the functionalized carbon nanotube is a change according to an amount dispersed at 0.50(1), 1.25(2), 2.50(3), and 5.00(4) ppm in dispersion. It can be confirmed that as the CNT concentration increases, transmittance (% T) reduces and as the CNT dispersion content increases, transmittance lowers.

TABLE 1

| Division | Oxidizer | RAMAN ($A_D/A_G$) | XPS ($O_{1S}$, atom %) |
|---|---|---|---|
| Example 1 | $O_2$ | 0.229 | 5.72 |
| Example 2 | $O_2$ | 0.235 | 6.17 |
| Example 3 | $O_2$ | 0.212 | 5.32 |
| Example 4 | Air | 0.146 | 4.51 |
| Example 5 | Air | 0.194 | 4.74 |
| Example 6 | Ozone | 0.153 | 5.58 |
| Example 7 | Ozone | 0.214 | 4.82 |
| Example 8 | Peroxide | 0.175 | 4.72 |
| Example 9 | Peroxide | 0.171 | 5.52 |
| Example 10 | Nitric acid | 0.158 | 9.69 |
| Example 11 | Nitric acid | 0.235 | 8.89 |
| Example 12 | $O_2$ | 0.230 | 5.73 |
| Example 13 | $O_2$ | 0.237 | 6.16 |

Table 1 digitizes results shown in FIG. 5 and FIG. 8 and it was confirmed that the degree of the functionalized carbon nanotube is $0.01 \leq A_D/A_G \leq 0.50$ by Raman spectroscopy and the degree of the functionalized carbon nanotube is $0.1 \leq O_{1s}$, atom % $\leq 30$ atom % by XPS.

Those skilled in the art will appreciate that the conceptions and specific examples disclosed in the foregoing description may be readily utilized as a basis for modifying or designing other examples for carrying out the same purposes of the present invention. Those skilled in the art will also appreciate that such equivalent examples do not depart from the spirit and scope of the invention as set forth in the appended claims.

The invention claimed is:

1. A continuous method of functionalizing a carbon nanotube, comprising:
   a) continuously feeding the carbon nanotube solution and an oxidizer under a pressure of 50 to 400 atm to a preheater via a heat exchanger, respectively or together, and then preheating the mixture of said carbon nanotube solution and said oxidizer into a temperature of 100 to 370° C.;
   b) functionalizing the carbon nanotube in the preheated mixture under the subcritical water conditions of more than 100° C. to less than 374° C. and 50 to 400 atm;
   c) cooling down the functionalized product into 0 to 100° C. and depressurizing the functionalized product into 1 to 10 atm by feeding the functionalized product into a cooling down and depressing part via the heat exchanger of the step (a) while carrying out the process of the step (a); and
   d) recovering the cooled down and depressurized product.

2. A continuous method of functionalizing a carbon nanotube according to claim 1, wherein at the step c), the temperature for cooling down the functionalized product ranges from 20 to 50° C.

3. A continuous method of functionalizing a carbon nanotube according to claim 1, wherein the step c) further includes e) filtering a product at high pressure.

4. A continuous method of functionalizing a carbon nanotube according to claim 1, further including after step d), dispersing the product in the solvent.

5. A continuous method of functionalizing a carbon nanotube according to claim 4, wherein the solvent is water or an organic solvent that is selected from a group consisting of hydro carbon, alcohol, ketone, amine, alkyl halogen, ether, furan, sulfur containing solvent, and mixtures thereof.

6. A continuous method of functionalizing a carbon nanotube according to claim 1, wherein at step a), the carbon nanotube is selected from a group consisting of single-walled, double-walled, thin multi-walled, multi-walled, roped and mixtures thereof.

7. A continuous method of functionalizing a carbon nanotube according to claim 1, wherein at step a), the carbon nanotube solution includes CNT and a solvent that is selected from a group consisting of water, aliphatic alcohol, carbon dioxide, and mixtures thereof.

8. A continuous method of functionalizing a carbon nanotube according to claim 1, wherein at step a), the CNT is included as 0.0001 to 10 wt % in the CNT solution.

9. A continuous method of functionalizing a carbon nanotube according to claim 1, wherein at step a), the oxidizer is selected from oxygen, air, ozone, nitric acid, hydrogen peroxide and mixtures thereof.

10. A continuous method of functionalizing a carbon nanotube according to claim 9, wherein at step a), the oxidizer is included as 0.001 to 10 equivalents in proportion to the carbon equivalent of the CNT in the mixture.

11. A continuous method of functionalizing a carbon nanotube according to claim 3, further including after step d) or step e), dispersing the product in the solvent.

* * * * *